United States Patent
Van Hooren et al.

(10) Patent No.: US 8,657,147 B2
(45) Date of Patent: Feb. 25, 2014

(54) FLUID LINE

(75) Inventors: Marc Van Hooren, Freigericht-Bernbach (DE); Burkhard Wirth, Biebergemuend (DE)

(73) Assignee: Veritas AG, Geinhausen (DE)

(*) Notice: Subject to any disclaimer, the term of this patent is extended or adjusted under 35 U.S.C. 154(b) by 502 days.

(21) Appl. No.: 12/952,974

(22) Filed: Nov. 23, 2010

(65) Prior Publication Data

US 2011/0147393 A1    Jun. 23, 2011

(30) Foreign Application Priority Data

Dec. 22, 2009 (DE) .......................... 10 2009 060 065

(51) Int. Cl.
*B65D 25/00* (2006.01)
*F16L 9/00* (2006.01)

(52) U.S. Cl.
USPC ............................ 220/694; 220/86.2; 138/177

(58) Field of Classification Search
USPC .......... 220/694, 86.1, 86.2, 86.4; 138/DIG. 7, 138/177, 137, 141, 121, 122; 428/36.91
See application file for complete search history.

(56) References Cited

U.S. PATENT DOCUMENTS

| | | | | |
|---|---|---|---|---|
| 3,728,846 | A | * | 4/1973 | Nilsson ......................... 220/86.2 |
| 5,183,170 | A | * | 2/1993 | Stege ............................ 220/86.2 |
| 5,957,164 | A | | 9/1999 | Campbell |
| 5,960,977 | A | * | 10/1999 | Ostrander et al. ............ 220/86.1 |
| 6,329,463 | B1 | | 12/2001 | Abraham et al. |
| 2002/0074050 | A1 | * | 6/2002 | Ikeda et al. .................... 138/137 |
| 2003/0124284 | A1 | * | 7/2003 | Ikemoto et al. ............. 428/36.91 |
| 2007/0055018 | A1 | | 3/2007 | Achten et al. |
| 2008/0202616 | A1 | * | 8/2008 | Bergere et al. .................. 138/33 |
| 2009/0227725 | A1 | | 9/2009 | Varnhorn et al. |

FOREIGN PATENT DOCUMENTS

| | | |
|---|---|---|
| DE | 695 26 741 T2 | 8/2002 |
| DE | 698 15 032 T2 | 4/2004 |
| DE | 699 28 686 T2 | 8/2006 |
| DE | 10 2005 042 265 A1 | 3/2007 |
| EP | 1 619 218 B1 | 5/2008 |
| WO | WO2010076225 * | 8/2010 |

* cited by examiner

*Primary Examiner* — Andrew Perreault
(74) *Attorney, Agent, or Firm* — Buchanan Ingersoll & Rooney PC

(57) ABSTRACT

A container with a tube is disclosed, which is suitable for receiving therein urea-containing liquids and which, especially due to its material properties, can easily be installed subsequently into vehicles and engines. The tube can consist of TPV.

11 Claims, 2 Drawing Sheets

FLUID LINE

The present invention relates to a fluid line used for filling, venting or emptying a container, which is adapted to accommodate a urea-containing liquid, in particular a urea solution, as well as for conveying a urea-containing liquid, and to a container with a urea-containing liquid, in particular a urea solution, said container having articulated thereon a fluid line.

In addition, the present invention relates to a fluid line for use in selective catalytic reduction processes in vehicle engines and to a kit comprising a fluid line and a container, for use in vehicle engines, said fluid line and/or said container consisting essentially of TPV.

The present invention additionally relates to a vehicle with a fluid line and a container, which is suitable for accommodating a urea-containing liquid, in particular a urea solution, the fluid line being used for conveying the urea-containing liquid and/or for filling, emptying or venting the container.

BACKGROUND

During the combustion of diesel fuel in vehicles, a high degree of nitric oxides is formed, which cannot, or only unsatisfactorily, be filtered by means of the conventional catalytic converter technology. Hence, SCR catalytic converters, which are based on selective catalytic reduction, have already been used for some time for the purpose of reducing the nitric oxides. For effecting said selective catalytic reduction, a urea solution is injected into the exhaust gas flow, so that the most of the nitric oxides will be converted into nitrogen and hydrogen. This technique and the urea solution are also known under the brand name AdBlue. The urea solution is stored in special containers or tanks from where it is supplied by means of metering pumps via lines and tubes to injectors for injection into the exhaust gas flow.

The material that has hitherto been used for the lines and tubes has normally been polyamide, preferably PA 12. The polyamide tubes are preformed so that, once installed, they will retain their curvatures and geometries comparatively stiffly. In addition, polyamide tubes and lines may also be coated with additional materials, which make the tubes and lines resistant to the urea-containing liquid. In the case of known polyamide tubes, a so-called hydrolysis takes place, in the course of which the material is chemically broken down in contact with water. Only one third of the urea solution consists of urea; the balance is water. Hence, polyamide has a non-proven, permanent resistance to the urea solution, so that coated polyamide is preferably used.

The components used for the purpose of selective catalytic reduction, such as the tubes and lines for filling, emptying, feedback and also for venting the tanks must, especially in the case of passenger cars, be configured such that they have many angles and take up little space. Insofar, complex geometries of the lines and tubes are obtained. As has already been mentioned hereinbefore, the polyamide tubes are preformed for this purpose, so that the tubes can easily be adapted to the respective situation. During installation, the polyamide tubes are, due to the space available, bent, stretched or compressed, so that stress whitening may occur. This has the effect that the tubes are weakened, even though they do not break.

SUMMARY

It is therefore the object of the present invention to further develop the above-mentioned fluid lines and containers for urea solutions and to make them more easily installable, especially also against the background of retrofitting.

According to the present invention, this object is achieved with a fluid line that consists essentially of TPV, a thermal vulcanizate.

The material is a blend of an EPDM (butyl rubber) and a polypropylene. Polypropylene is particularly suitable for use with aggressive media, since it is very resistant to alkalis and the like. This blend is vulcanized so that it will have rubber-like characteristics.

In addition, TPV also has excellent recycling characteristics and it is re-usable. It is therefore environmentally compatible to a high degree, and this also contributes to a high cost-effectiveness in the manufacturing process.

According to a preferred embodiment of the invention, the fluid line comprises more than 90% by weight, preferably more than 95% by weight, preferably more than 99% by weight of TPV.

Tests have shown that the material is highly resistant to aggressive liquids of different kinds and grades. In contrast to conventional approaches, which provide especially multi-layer tubes, not only the production but also the disposal of the fluid line according to the present invention can be simplified to a substantial extent, since it is essentially only a single material that has to be provided, processed and, later on, be disposed of, a circumstance that proves to be advantageous from the economic and especially from the ecological point of view.

According to an advantageous further development of the present invention, the fluid line therefore comprises at least one layer, in other cases also several layers, wherein at least one fluid line layer and/or container layer that comes into contact with the urea solution consists of TPV. If the fluid line is composed of one layer, at least one surface of an inner tube as well as of an outer tube will consist of TPV. Alternatively, it may, however, be expedient to provide the outer surface with a protective layer that protects against external influences and flames. Such additional layers may be applied as very thin layers by means of methods known from the prior art, or they may also have greater thicknesses in certain areas thereof. These greater thicknesses impart to the fluid tube additional positive characteristics, such as partial stabilization, an increased resistance to heat, or the like.

The object is also achieved by a device, in the case of which the fluid line that is articulated on the container with a urea-containing liquid, in particular a urea solution, consists essentially of TPV.

According to a preferred further development, especially at least one of the fluid lines is arranged partially within the container. For removing urea from the tank, it is not always possible to provide a discharge opening in a vertically lower area of the tank, where the urea solution can flow off due to the force of gravity. Hence, the fluid line extends at least partially into the tank. In this case, it will be of advantage when also an outer surface of the fluid line consists of TPV so that said outer surface will have the same characteristics as an inner surface along which the urea solution is conducted. In order to achieve this in a simple manner, the fluid line is implemented as a TPV monotube. It is thus possible to implement the fluid line according to the present invention in an AdBlue-resistant manner, in particular also in a condition in which it is fully immersed in a urea solution (in-tank application), so that also the risk of delamination of multilayer lines will be reduced substantially.

According to another preferred embodiment, at least two fluid lines are connected to the container. Due to the SCR technique, it may be necessary to provide not only a tube for filling the container but also a tube with which surplus urea solution can be fed back. Likewise, it is also necessary to provide openings having tubes articulated thereon, which allow the tank to be vented.

According to an advantageous embodiment, the fluid line is flexible so that coupling means can more easily be pushed onto the fluid line and so as to allow subsequent installation of the fluid line in vehicles. Other than the conventionally used material, TPV is flexible and pliable. It is thus possible to easily connect couplings used for connecting the fluid line with other components, such as the tank, a pump or an injection nozzle. In particular, it is not necessary to configure an end portion of a fluid line such that it is adapted to a coupling element. The tubes and lines produced from a basic material are vulcanized and shaped simultaneously such that they can be installed in a respective engine in a space-saving manner. Hence, the tubes have three-dimensional characteristics after vulcanization. Due to the high flexibility, the tubes can be given a length which exceeds that of prior art tubes, since the risk of stress whitening during processing and installation of the tubes no longer exists.

The above-described and implemented fluid line is used in selective catalytic reduction processes in vehicle engines.

The object of the present invention is additionally achieved by a kit having a fluid line and a container of the type described hereinbefore, which are suitable for use in vehicle engines, in particular for subsequent installation in vehicle engines. In view of the high flexibility and pliability, especially the fluid line according to the present invention is particularly suitable for subsequent installation in vehicles. Other than the lines according to the prior art, the present fluid line can easily be adapted to the conditions prevailing e.g. in an engine compartment and installed.

A device for achieving the object includes a fluid line consisting essentially of TPV, and comprising preferably more than 90% by weight, preferably more than 95% by weight, preferably more than 99% by weight of TPV, at least one fluid line surface and/or container surface that comes into contact with the urea solution consisting of TPV. A vehicle has all the advantages resulting from the use of fluid lines consisting of TPV.

Further advantageous embodiments of the device can be seen from the subclaims.

BRIEF DESCRIPTION OF THE DRAWINGS

A preferred embodiment of the invention is explained in more detail hereinbelow making reference to the drawing, in which.

DETAILED DESCRIPTION

Figure 1:
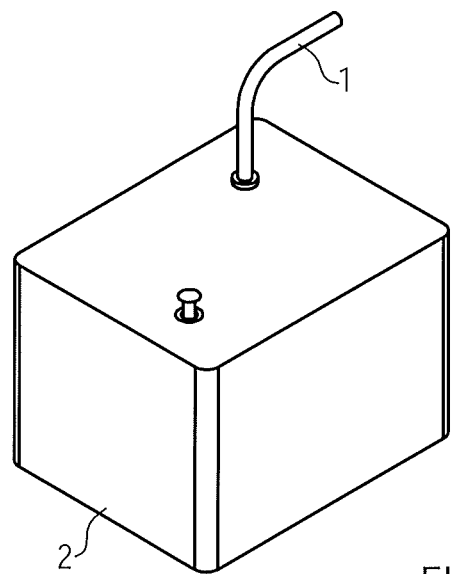
FIG. 1 shows a perspective view of a fluid line with a tank.
Figure 2:
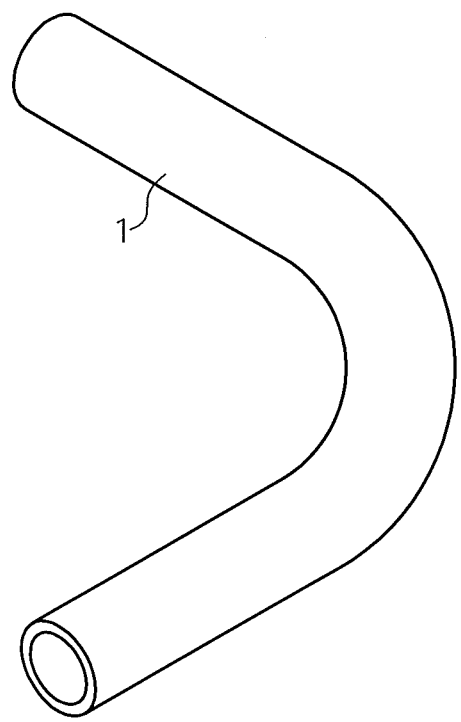
FIG. 2 shows a perspective view of a fluid line.
Figure 3:
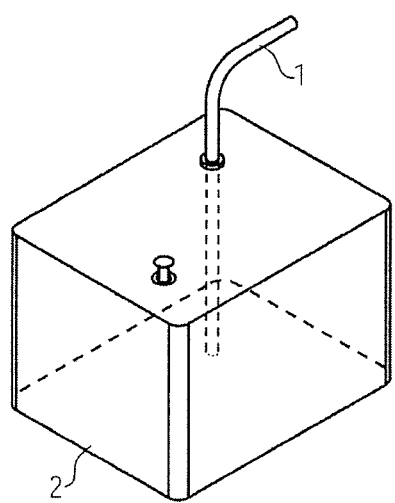
FIG. 3 shows the fluid line arranged partially within the tank.

A fluid line 1 according to the present invention with a container is exemplarily shown in FIG. 1 in a perspective view. The tank 2 is intended to be filled with a liquid containing urea. The urea solution is used for exhaust gas cleaning in motor vehicles by injecting the solution into the exhaust gas flow where it will cause a break down of nitric oxides into nitrogen and hydrogen. This method is also referred to as selective catalytic reduction and known under the abbreviation SCR method, according to the English designation "selective catalytic reduction". In addition, the urea solution is known on the German market under the brand name AdBlue.

The urea solution is stored in special containers, viz. in the tanks 2 shown in FIG. 1, which consist essentially of polyamide and which are coated with TPV on an inner surface thereof. In the development of vehicles or engines, such tanks 2 can easily be provided for in the vehicle, i.e. in the engine compartment. The situation is, however, different when an exhaust gas cleaning unit operating according to the SCR method is to be subsequently installed in a vehicle or an engine. For installing the tanks 2 and the fluid lines 1 subsequently, complex geometries are sometimes necessary, since only a limited amount of space is available.

Making use of the lines according to the present invention, installation will become much simpler, since the lines consist of TPV, and, within the framework of the present invention, this mean that the fluid lines comprise more than 90% by weight, preferably more than 95% by weight, preferably more than 99% by weight of TPV. According to a preferred embodiment, the components consist of 100% by weight of TPV and are implemented as a single-layer TPV monotube. However, small percentages of other materials may be comprised as well, e.g. when the fluid line 1 is equipped with different functional sections, such as connections, marks, couplings and so forth. Likewise, the lines may comprise on an outer surface thereof a layer which consists of a material other than TPV and which protects the lines against external influences without impairing their flexibility.

The fluid lines 1 are configured such that they are particularly flexible and pliable, which means that they can be installed more easily. It is thus possible to install said fluid lines 1 also at locations that are difficult to access or to conduct them through bottleneck areas, without exceeding a yield point of the material. During vulcanization, the lines and tubes consisting of the basic material are simultaneously shaped for installation. The shape of a fluid line 1 is thus not exclusively linear, but it is preferably three-dimensional and comprises curvatures, bends or the like. In spite of the predetermined three-dimensional shape, the tubes have, after vulcanization, a high flexibility which makes installation much easier.

The fluid line 1 made of TPV has a good resistance to ozone, ultraviolet light and chemicals, TPV being adapted to be used in a temperature range of from $-60°$ to $+135°$ C. The fluid lines 1 according to the present invention preferably have the following mechanical properties:
density: 0.94 g/cm$^3$
flexural stiffness/tensile strength: 12 MPa
breaking elongation: 15 MPa In view of the tolerances that have to be reckoned with, the above-specified values may vary, so that for the flexible parts also values between 11 and 13 MPa and for the breaking elongation values between 12 and 18 MPa may be possible. In view of these mechanical properties, the fluid lines have outer to inner diameter ratios of from 2:1 to 1.2:1. In any case, the wall thickness of the fluid lines 1 is at least 1 mm and not more than 5 mm, with possible tolerances of up to 0.3 mm, so that also wall thicknesses of 0.7 to 5.3 mm may be reached.

The fluid lines 1 can be used for different purposes. Generally, the fluid lines 1 are used for conveying the urea solution, which also includes filling and emptying. Likewise, the lines are used for venting the tanks 2, so that a tank 2 may have a plurality of connections with lines.

It is also intended to arrange at least part of the TPV fluid line 1 within the tank 2. In these cases, the fluid line 1 comprises almost 100% of TPV, so that at least an outer and an inner surface of the line consists of TPV. The fluid lines 1 are in these cases configured as TPV monotubes.

Due to the flexibility, it is also easily possible to fix connections and couplings to the fluid lines 1. The lines can easily be pushed onto the connections and couplings. Likewise, the lines can be expanded for pushing on the couplings, e.g. in the form of tri-connectors.

A particularly advantageous characteristic of the TPV lines according to the present invention is their ability to regain original shape. In addition to their flexibility, the lines always regain their original shape after having been expanded or bent for the purpose of installation. This is particularly suitable for subsequent installation, since, as regards geometry and possible curvatures, the lines can be designed in accordance with their routing in the engine or vehicle and subsequently they can be installed in a flexible manner. In so doing, it is not necessary to take care that a line is not bent beyond a yield point, such bending causing regularly fractures in the case of prior art tubes.

The invention claimed is:

1. A kit comprising a fluid line and a container, for vehicle engines, said fluid line consists essentially of thermoplastic vulcanizate (TPV), the fluid line used for filling, venting or emptying the container, which is adapted to accommodate a urea-containing liquid, as well as for conveying the urea-containing liquid, wherein the fluid line is implemented as a monotube, has a flexural stiffness of 11 to 13 MPa and an outer to inner diameter ratio of 2:1 to 1.3:1, with a wall thickness of at least 0.7 mm to not more than 5.3 mm and wherein at least the fluid line is arranged partially within the container.

2. The kit according to claim 1, wherein the fluid line comprises more than 90% by weight of TPV.

3. The kit according to claim 1, wherein the fluid line has a breaking elongation of 12 to 18 MPa.

4. The kit according to claim 1, wherein the fluid line comprises at least one layer, wherein at least one fluid line layer that comes into contact with the urea solution consists essentially of TPV.

5. The kit configured according to claim 1 for a selective catalytic reduction process in a vehicle engine.

6. The kit according to claim 1, wherein said container consists essentially of TPV.

7. The kit according to claim 1, wherein the urea-containing liquid is a urea solution.

8. The kit according to claim 1, wherein the fluid line comprises more than 99% by weight of TPV.

9. The kit according to claim 1, wherein the fluid line has a wall thickness of at least 1 mm to 5 mm.

10. A vehicle comprising a fluid line and a container, for an engine of the vehicle, said fluid line consists essentially of thermoplastic vulcanizate (TPV), the fluid line used for filling, venting or emptying the container, which is adapted to accommodate a urea-containing liquid, as well as for conveying the urea-containing liquid, wherein the fluid line is implemented as a monotube, has a flexural stiffness of 11 to 13 MPa and an outer to inner diameter ratio of 2:1 to 1.3:1, with a wall thickness of at least 0.7 mm to not more than 5.3 mm and wherein at least the fluid line is arranged partially within the container.

11. The vehicle according to claim 10, wherein the container is adapted to accommodate a urea solution.

* * * * *